UNITED STATES PATENT OFFICE 2,105,633

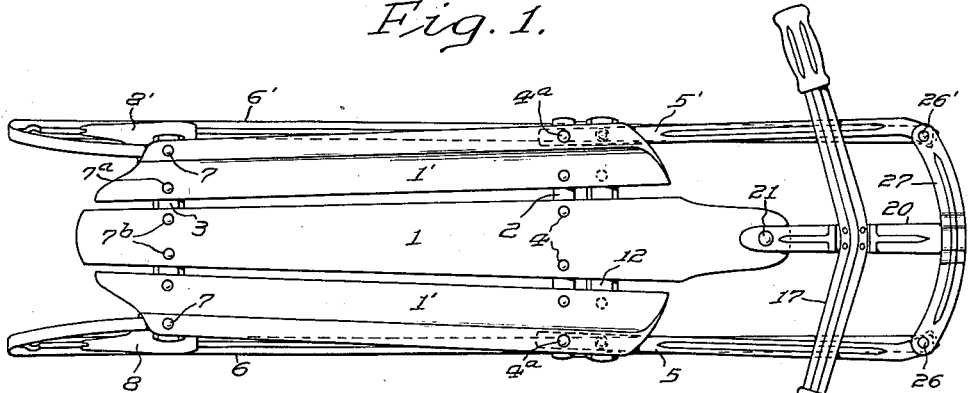
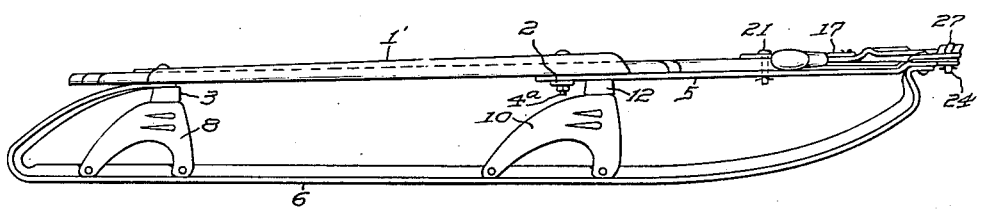
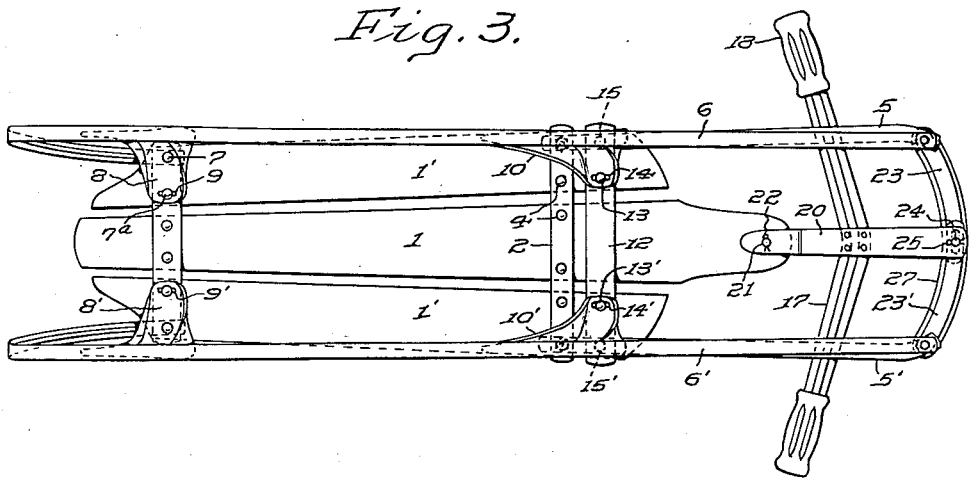

STEERING SLED

James Monroe Bowen, Cape May Court House, N. J., assignor to S. L. Allen & Co., Inc., Philadelphia, Pa., a corporation of Pennsylvania Application October 23, 1936, Serial No. 107,124

6 Claims. (Cl. 280—22)

This invention relates to sleds of the type which are steered by bending the runners and is particularly directed to improvement of the steering qualities of such sleds and to increasing the facility with which they may be steered and minimizing the effort required therefor while at the same time permitting sufficient lateral deflection of the runners to direct the sled in a curve of small radius without danger of breaking the runners and/or brackets on which they are mounted.

I am aware that sleds having steering mechanism comprising side links forming levers of the first class with their rear ends arranged to shift intermediate portions of the runners laterally in a direction opposite that in which their forward ends are moved in steering the sled have been manufactured, but it has been found in practice that when such sleds are steered on curves of relatively small radius, the sharp bending of the runners incident thereto produces excessive stresses in the runners and/or runner brackets with resultant frequent deformation or breakage of these parts under conditions of use to which sleds are ordinarily subjected. Moreover, in such sleds a long portion of each runner is totally unsupported between the front end of the sled and the front runner bracket and this also sometimes causes runner breakage during normal use, but it has been found impractical to remedy this condition by locating the runner bracket nearer the front of the runner without materially impairing the steering qualities of the sled.

It is therefore a principal object of the invention to provide a sled having steering means whereby in steering the sled the runners are bent on arcs of substantially constant radius and excessive bending at any point is avoided with consequent substantial elimination of runner breakage and attainment of improved steering qualities.

A further object is to provide a sled having steering mechanism embodying side links acting as levers of the second class so proportioned and interconnected with the runners as to facilitate proper deflection of the latter in steering the sled without causing excessive strains therein at any point.

Another object is to provide a sled comprising steering mechanism of such character that when the sled is steered and the front ends of the runners thus deflected laterally in either direction, their intermediate portions are also moved laterally in the same direction through lateral movement of the front runner brackets for a distance so proportioned to the movement of the front ends of the runners as to insure proper bending of the runners on substantially uniform arcs, while the front brackets are positioned more closely adjacent the front ends of the runners than in sleds of generally similar type which have heretofore been proposed whereby the length of the unsupported portions of the runners between their forward ends and said brackets is reduced to a minimum with consequent lessening of the danger of runner breakage through lack of adequate support.

Other objects, purposes and advantages of the invention will hereinafter more fully appear or will be understood from the following description of a sled constructed in accordance therewith as illustrated in the accompanying drawings in which:

Fig. 1 is a top plan view of the sled in normal position;

Fig. 2 is a side elevation thereof;

Fig. 3 is a bottom plan view thereof;

In the several figures like characters are used to designate the same elements.

Figure 4:
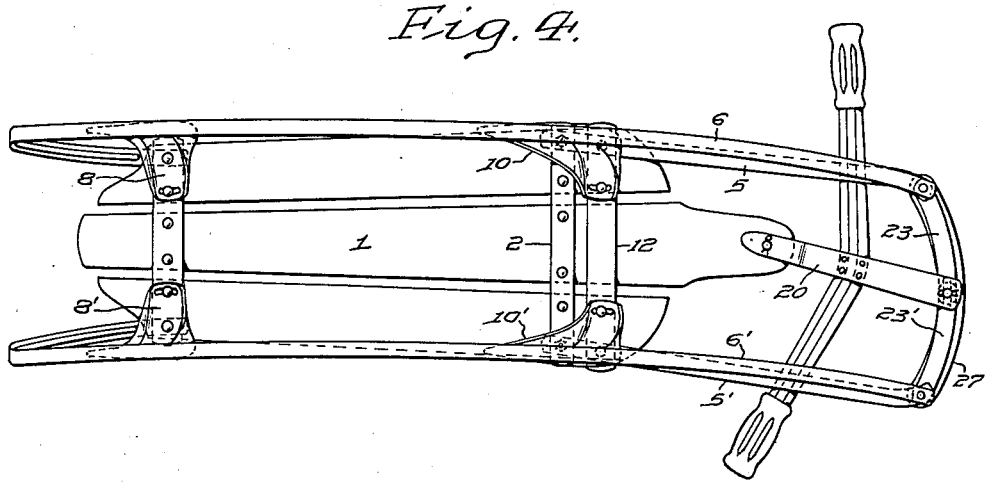
Fig. 4 is a bottom plan view corresponding to Fig. 3 but showing the sled as it appears when the runners are flexed as in steering.
Figure 5:
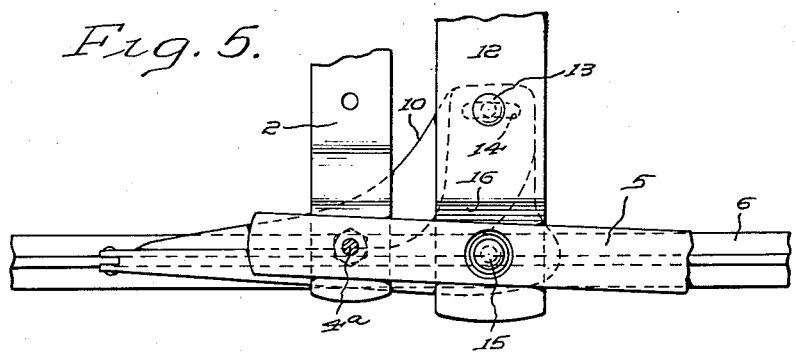
Fig. 5 is an enlarged fragmentary top plan view of the rear end of one steering link and associated parts below the plane of the under side of the deck.
Figure 6:
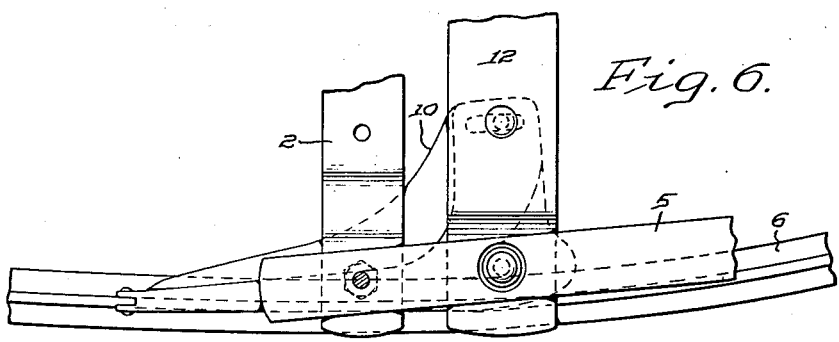
Fig. 6 is a corresponding view with these parts approximately in the positions they assume when the runners are flexed.

Referring now more particularly to the drawings, as shown the sled embodies a top or deck comprising a longitudinally extending rearwardly tapered center panel 1 and outer panels 1', 1' respectively disposed parallel to its edges on opposite sides thereof, the center panel being considerably longer than the others and extending forwardly an appreciable distance beyond their front ends. The outer edges of the side panels are preferably somewhat thicker than their other portions and form in effect integral side rails which enhance the rigidity of the deck as a whole.

The several panels are secured to transversely extending members 2, 3, the first member 2 being a rigid metal strip or cleat spaced rearwardly of the front end of the panels and secured thereto by rivets 4. The ends of this cleat are slightly downwardly offset for the reception of the rear extremities of the side steering links 5, 5' through which the end bolts 4a extend and serve as pivotal centers for these links. The rear member or bench 3 is preferably formed of wood and is rabbeted out at its ends for the reception of the upper extremities of the subjacent runners 6, 6', which are reversely upwardly and forwardly curved at their rear ends, their extremities being pivoted on rivets 7, passing through bench 3 and the adjacent side rail portions of the deck panels 1', 1'. The rear portions of the runners are also secured to the ends of the bench 3 through brackets or knees 8, 8' pivoted on the lower parts of rivets 7, and other rivets 7a securing the inner portions of deck panels 1', 1' to the bench extend through slots 9, 9' in the knees 8, 8' and hold them in assembled relation with the bench and deck panels while permitting their limited pivotal movement with respect thereto about rivets 7. The center deck panel 1 is rigidly secured to bench 3 by rivets 7b which do not engage the runner knees.

Slightly forward of the midpoint between the rear knees and the front ends of the runners, additional substantially similar but preferably somewhat higher knees 10, 10' are mounted on the runners and pivotally secured to a floating bench 12 movable laterally of the superjacent deck. This securement is effected by inner rivets 13, 13' extending through slots 14, 14' in the knees and through bench 12 with their heads countersunk in the upper surface of the latter so as not to interfere with its free movement relatively to the superjacent deck, and similar rivets 15, 15' set outwardly therefrom extending through the bench, side links 5, 5' and knees to provide pivotal connections between these parts, the upper heads of these rivets being also countersunk in the upper surfaces of the links. As the ends of the floating bench 12 are rabbeted out at 16 to form spaces for reception of the side links between such ends and the deck with sufficient lateral clearance to permit the links to move about the pivots 4a through limited arcs without striking the edge of the rabbeted recesses, the plane of the upper surface of bench 12 is thus unobstructed to permit it to slide freely under the deck as the sled is steered.

The steering mechanism at the extreme front end of the sled is in many respects similar to that disclosed in my prior Patent 1,820,044, issued August 25, 1931, and comprises a handle bar 17 disposed in advance of the center panel 1 so as to normally extend transversely of the sled substantially in the plane of the top deck. This handle bar, comprising laterally projecting and rearwardly inclined integral arms disposed at an angle to each other of somewhat less than 180° and of sufficient length to project beyond links 5, 5' on either side of the sled, preferably has grips 18 of rubber or the like secured to its ends by means of which the operator can actuate the bar with his hands or feet, depending on his position on the sled, to steer the latter in the desired direction, the handle bar being fixedly secured at its midpoint to a steering bar 20 which normally extends longitudinally of the sled along its center line. This steering bar is desirably formed of two strips of flat steel extending above and below the deck at their rear ends and pivoted to the forward end of the center deck panel 1 by a pivot bolt 21 inserted through both parts of the steering bar and held in position by a cotter pin 22 or in any other convenient way. At its forward end it is pivotally connected to two similar, oppositely inwardly extending curved steering links 23, 23' by a pivot bolt 24 held in place by a cotter pin 25, and the opposite ends of these links are connected to the forward ends of the runners by riveted pivots 26, 26'. These pivots also connect to the runner ends the forward inwardly turned ends of the side links 5, 5' and the ends of a curved bumper bar 27 overlying the curved steering links 23, 23' and projecting slightly in front of their forward edges to protect them from being struck in the event of collision. The side links are preferably arranged to diverge slightly outwardly from pivots 15, 15' so as to normally lie in substantial prolongation of the thickened edges of the side panels of the deck and thereby assist in carrying out the general "streamlined" contour of the sled as a whole.

When the handle bar is moved in either direction to steer the sled it thus acts through the steering bar and front steering links to swing the bumper bar, the forward ends of the runners and the side links in a corresponding direction. As has been explained, the side links at their rear ends are pivoted to cleat 2, in turn fixed to the deck, and the floating bench is pivoted to the links a short distance forwardly of these pivots, with the result that when the links are swung in either direction by the action of the handle bar, the floating bench is moved laterally a distance somewhat less than, but proportional to, the distance the front ends of the links are moved, and in the same direction. However, the rear runner bracket pivots cannot move laterally with respect to the deck though they can pivot slightly about rivets 7; consequently when the handle bar is actuated the runners are flexed along curves of substantially constant radius from end to end, as shown in Fig. 4, their rear ends, beyond the pivotal centers of the rear knees, being swung laterally relatively to the deck in the direction opposite to that of their front ends a distance determined according to the radius of curvature of the runners as a whole. The runners therefore "track" accurately from end to end in the curve along which the sled is steered as well as in straight lines when the steering mechanism is in normal position, eliminating the slowing effect of the "skidding" of some parts of the runners which is inevitable when they are deflected along curves of varying radius or when only certain portions are deflected while the rest remain straight. Moreover, the uniform bending of the runners on a curve of substantially constant radius avoids excessive stresses at any point and runner breakage from this cause is reduced to a minimum.

It is also to be noted that when the runners are flexed to the limit permitted by the steering mechanism, their front ends are perhaps not displaced laterally as far in this improved sled as has been the case in some sleds heretofore constructed. However, by providing mechanism producing uniform curvature of the runners, my invention results in the sled following a path the curvature of which corresponds exactly to that of the runners, whereas sleds in which the front ends of the runners are displaced a greater distance, without uniform curvature of the runners from end to end, are prevented by the straight, or least sharply curved, parts from following a path corresponding to the curvature of the most sharply curved portions, while this reluctance of the less sharply curved, or uncurved portions to follow such path induces "skidding" of at least some portions of the runners which materially retards the speed of the sled and prevents it from following a path conforming to their sharpest curvature.

Consequently, while my improved steering mechanism is preferably so constructed as to flex the runners less sharply than has sometimes been possible in certain sleds of the general type with which my invention is concerned, with elimination of excessive strains on the runners and brackets, there is no sacrifice of actual steering ability or speed of the sled during non-rectilinear travel; in fact the latter is enhanced through elimination of the retarding effect of non-uniform curvature of the runners.

I have herein described with considerable particularity one type of sled constructed in accordance with a preferred embodiment of the invention, but it will be understood that similar mechanical principles may be utilized in sleds of other types and that changes and modifications in the form, construction and arrangement of the several parts which will readily occur to those skilled in the art may be made if desired without departing from the spirit and scope of the invention as defined in the appended claims.

Having thus described my invention I claim and desire to protect by Letters Patent of the United States:

1. A steering sled having laterally bendable runners, a deck disposed above the runners, runner brackets mounted on the runners, front and rear cross benches supporting the deck from the brackets and pivoted adjacent their ends to the brackets, the front cross bench being slidable laterally of the deck, means secured to the deck between the front and rear benches affording fixed pivots adjacent opposite sides of the sled, side links movable about said pivots extending forwardly from said means having pivotal connections with the ends of the front bench and the front ends of the runners, and means including a handle bar for laterally shifting the front ends of the links and runners to thereby laterally shift the front bench in a corresponding direction a distance proportional to but less than that said front ends are shifted to thereby bend the runners to steer the sled.

2. In a steering sled having laterally bendable runners and means interconnecting their front ends, a laterally movable bench disposed rearwardly of said means, runner brackets having pivotal connections with the bench adjacent its ends and relatively rigid connections with the runners, a side link pivotally interconnected with the front end of each runner and with a corresponding end of the bench having a relatively stationary pivotal center disposed rearwardly of the latter, and means for laterally shifting said runner interconnecting means selectively in opposite directions about their said pivotal centers to thereby shift the front ends of the runners and the links and bench in the same direction to steer the sled.

3. In a steering sled having laterally bendable runners, front and rear brackets mounted on the runners, front and rear benches supported on said brackets and having pivotal connections therewith, a deck secured to the rear bench and overlying the front bench but free of positive connection therewith, a pair of side links movable about fixed pivots disposed between said benches and pivoted to the front ends of the runners, pivotal connections between the links and the front bench, and means for simultaneously swinging the links about said fixed pivots to shift the front bench in a like direction a distance proportional to the distance the front ends of the runners are correspondingly shifted and to swing the rear portions of the runners relatively to the rear bench about the pivotal connections of the latter with the rear brackets.

4. In a steering sled having laterally bendable runners, a deck supported therefrom, side links extending rearwardly from the front ends of the runners and pivoted at their rear ends at points fixed with respect to the deck, a bench pivotally connected at its ends with the runners, extending transversely beneath and laterally movable with respect to the deck, having pivotal connections with the links forwardly of their rear ends, and means for moving the front ends of the runners and links transversely relatively to the deck to thereby move the bench in a like direction to bend the runners laterally.

5. In a steering sled having laterally bendable runners, a deck supported therefrom, side links extending rearwardly from the front ends of the runners, means providing fixed pivots for the rear ends of the links extending transversely of and fixed to the deck, a bench extending beneath the deck forwardly of said means, movable laterally with respect to the deck and connected at its ends with the runners, pivots connecting the bench with the side links and means including a handle bar extending transversely of the sled for shifting the front ends of the runners and links laterally to thereby move the bench in a like direction to bend the runners.

6. A steering sled having laterally bendable runners, front and rear runner brackets mounted thereon, a deck above the brackets, a rear bench interposed between the deck and the rear brackets, a pivot extending vertically through the deck, bench and bracket substantially above each runner, the bracket being capable of limited oscillation thereabout, a front bench disposed in alignment with the front runner brackets and slidable transversely of the deck, side links intersecting said bench and pivoted to the front ends of the runners, a pivot extending vertically through each link, said bench and the subjacent bracket substantially above each runner, the bracket being capable of limited oscillation thereabout, means fixed to the deck in rear of the front bench providing pivots for the rear ends of the links and means including a handle bar extending transversely of the sled for shifting the front ends of the runners and links laterally in either direction to shift the front bench transversely of the deck and bend the runners on substantially parallel curves as the brackets turn about their pivots.

JAMES MONROE BOWEN.